United States Patent [19]

Selvaggi et al.

[11] Patent Number: 4,702,825

[45] Date of Patent: Oct. 27, 1987

[54] SUPERCONDUCTOR HIGH GRADIENT MAGNETIC SEPARATOR

[75] Inventors: Jerry A. Selvaggi, Erie, Pa.; John R. Purcell, San Diego, Calif.

[73] Assignee: Eriez Manufacturing Company, Erie, Pa.

[21] Appl. No.: 685,405

[22] Filed: Dec. 24, 1984

[51] Int. Cl.[4] .......................... B03C 1/02; H02H 7/00

[52] U.S. Cl. ........................................ 209/224; 62/45; 62/514 R; 174/15 CA; 209/232; 361/19; 361/141

[58] Field of Search ................................ 209/213-215, 209/223.1, 224, 228, 232; 210/222, 223, 695; 62/45, 259.2, 514 R; 174/15 CA; 361/19, 141, 153; 335/216; 324/318, 319

[56] References Cited

U.S. PATENT DOCUMENTS

| | | | |
|---|---|---|---|
| 3,133,144 | 5/1964 | Cottingham et al. | 174/15 CA |
| 3,271,628 | 9/1966 | Prior | 361/141 |
| 3,305,699 | 2/1967 | Watrous et al. | 361/19 |
| 3,385,072 | 5/1968 | Marsing | 62/514 R X |
| 3,419,794 | 12/1968 | Weaver, Jr. et al. | 361/141 X |
| 3,502,946 | 3/1970 | Kimura | 361/141 |
| 3,503,504 | 3/1970 | Bannister | 209/232 X |
| 3,568,002 | 3/1971 | Robins et al. | 361/141 |
| 3,662,566 | 5/1972 | Brand | 62/514 R |
| 4,048,437 | 9/1977 | Vander Arend et al. | 335/216 X |
| 4,208,278 | 6/1980 | Stekly | 209/232 X |
| 4,209,657 | 6/1980 | Inai et al. | 335/216 X |
| 4,212,169 | 7/1980 | Kneip, Jr. | 62/514 R X |
| 4,272,365 | 6/1981 | Ries et al. | 209/223.1 |
| 4,330,399 | 5/1982 | Dijkhuis | 209/232 X |
| 4,349,853 | 9/1982 | Sato | 361/19 |
| 4,467,384 | 8/1984 | Yuasa | 361/19 |

FOREIGN PATENT DOCUMENTS

| | | | |
|---|---|---|---|
| 2521035 | 8/1983 | France | 209/213 |

OTHER PUBLICATIONS

A Superconducting Magnet System for a Very High Intensity Magnetic Mineral Separator, IEEE Transactions on Magnetics, vol. MAG-12, No. 5, pp. 493-497, Sep. 1976, J. A. Good, E. Cohen.

The Principles and Operation of a Very High Intensity Magnetic Mineral Separator, IEEE Transactions on Magnetics, vol. MAG-12, No. 5, pp. 552-555, Sep. 1976, H. Cohen, J. A. Good.

Design and Tests of a Control System for Thyristorized Power Supplies for Superconducting Coils, H. J. Boenig, W. S. Ranken Conference of Proceedings of the Seventh Symposium on Engineering Problems of Fusion Research, Knoxville, TN, Oct. 25-28, 1977.

*Primary Examiner*—Robert B. Reeves
*Assistant Examiner*—Edward M. Wacyra
*Attorney, Agent, or Firm*—Charles L. Lovercheck; Wayne L. Lovercheck; Dale R. Lovercheck

[57] ABSTRACT

A high gradient magnet is disclosed having a coil of superconducting material immersed in liquid helium in a toroidal shaped liquid helium vessel, supported in axial spaced concentric relation to a toroidal shaped liquid nitrogen vessel which forms one end of a toroidal heat shield made of high heat conductive material in which the liquid helium chamber is supported by a first coil support ring and a second coil support ring. The heat shield and liquid helium chamber are in turn supported in a toroidal shaped vacuum chamber which is in turn supported in a heavy iron cylindrical enclosure closed at the ends and having an opening through the center of its ends. A slurry containing iron particles may pass through the opening in the center whereby the iron particles from the slurry are retained by a matrix. The first coil support ring has two ends supported on the vacuum vessel and an intermediate part. The second coil support ring has two ends supported on the liquid helium chamber and an intermediate part connected to the intermediate part of the first coil support ring so that the liquid helium vessel is supported in spaced relation to the heat shield and in spaced relation to the liquid nitrogen vessel. A bipolar power supply is provided for the superconductor magnet whereby the magnet is magnetized and demagnetized in fast ramp fashion.

20 Claims, 11 Drawing Figures

SUPERCONDUCTOR HIGH GRADIENT MAGNETIC SEPARATOR

GENERAL STATEMENT OF INVENTION

The use of superconductor windings in electromagnets and electromagnetic separators is known to the prior art. The use of such conductors is discussed at length in *Research and Development* March 1984 at Page 104–108 in an article entitled Superconducting Metals and Alloys help further Science of the Impossible by Dr. Alfred McInturff. High gradient magnetic separators were also discussed by a J. R. Purcell and W. Y. Chen et al in IEEE Transactions on Magnetics Volume. Mag 17 No. 1, January 1981. Likewise in IEEE Transactions on Magnetics Vol. Mag-19 No. 3 May 1983 and similar articles in the IEEE Transactions on Magnetics have discussed such magnets.

Numerous patents have been issued on magnetic separators incorporating superconductor windings. The prior art has also recognized the problem of the cooling of superconducting magnets, for example in U.S. Pat. No. 3,781,733 and U.S. Pat. No. 4,380,712. None of the prior art has provided a highly efficient cooling arrangement or an electronic circuit for providing a fast ramping of the magnetic field of a superconductor magnetic separator.

This invention relates to a new support structure in combination with an electronic circuit for providing a fast ramping of the magnetic field of a superconductor magnetic separator.

DESCRIPTION OF THE INVENTION

Magnetic technology has taken a significant advance with the high gradient magnetic separators disclosed herein. The magnet quickly attains full magnetic strength and has an even faster decay time at its rated voltage. The unit ramps up from zero to full field strength of 5 tesla in 36 seconds and falls back down in only 27 seconds. This fast ramp capability increases production rates because high gradient magnetic separators are demagnetized periodically so trapped contaminants can be flushed out in a minimum of time.

The superconducting magnet produces a high gradient magnetic field to separate weakly magnetic particles from a variety of processed streams of materials, operates at a temperature close to zero kelvin, and is cooled first by liquid nitrogen and then by liquid helium. At such low temperatures such metals exhibit practically no resistance to electric current. Magnets designed with these metals generate extremely powerful magnetic fields with virtually no power dissipation or heat build up. Thus the superconducting magnet uses current, but no voltage. Therefore, substantially no power is required during steady state operation.

Energy cost savings realized by using the superconducting magnet are significant. A conventional laboratory high gradient magnetic separator, for example, takes approximately 200 KW to operate at 2 tesla. Applicant's superconducting laboratory model, by contrast, requires only 0.007 KW at 5 tesla. An additional 20 KW is required for a liquifier to recirculate liquid helium but even allowing for the power required for cooling, Applicant's invention will cut energy cost by 80% to 90% on an annual basis.

The magnet is basically an iron-clad solenoid which may be, for example, 37 inches high and 34 inches in diameter and weighing 6,000 lbs. The warm bore in the center of the circular coil may be 6 inches in diameter by 20 inches long. The magnet will accept canisters packed with a matrix of magnetic stainless steel wool up to 4 inches in diameter and up to 20 inches in length. The magnetic field strength can be continuously varied during operation by a simple potentiometer in the control circuit.

The high heat absorbing capability and low cost of liquid nitrogen reduce the temperature from a temperature ambient to 77 degrees Kelvin. Helium gas is then used to flush out the nitrogen before liquid helium is pumped into the chamber surrounding the coil. The helium further reduces the temperature below 10 degrees Kelvin where the magnet is in a superconducting state. A small quantity of liquid nitrogen is supplied to a chamber at the bottom of the magnet to insulate the liquid helium.

The problem in supporting cryogenic systems is in trying to get strength in the support and at the same time to minimize heat leak. If the area of the support is large to make it strong then it conducts more heat to the low temperature region. The amount of heat conducted is reduced as the support is made longer, however space limitations limit the length of the support member.

The support system used on the magnet disclosed is a reentry type in that it doubles back on itself and thus doubles the length the heat has a flow through to get from the room temperature surface to the cold helium vessel. Reentry support systems are not new per se, however, all the ones we are familiar with are cantilevered, i.e., they are only supported at one end and will take load in compression and not a side load. Joseph Heim has U.S. Pat. No. 3,781,733 on this type of support.

The unusual aspect of the present magnet is that it is supported at both ends and still retains the reentry aspect. This means the support will take side loads as well as compressive loads.

Because of the structural arrangement of parts and electrical circuit, the superconducting magnet disclosed herein can generate 5 tesla in the same sized machine as the conventional high gradient magnet seperator limited to 2 tesla and Applicant's superconducting magnetic separator weighs half as much as a conventional HGMS and requires only 10 percent of the power which in turn reduces the size of its power control unit.

OBJECTS OF THE INVENTION

The object of the inventin is to provide an improved high gradient superconducting magnetic separator.

Another object of the invention is to provide an improved coil suspension structure for a high gradient superconducting magnetic separator.

Another object of the invention is to provide an improved cooling system for a high gradient superconducting magnetic separator.

Another object of the invention is to provide a fast ramping circuit for a high gradient magnetic separator.

Another object of the invention is to provide a high gradient superconducting magnetic separator that is simple in construction, economical to manufacture and simple and efficient to operate.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF DRAWINGS

DETAILED DESCRIPTION OF DRAWINGS

Figure 1:
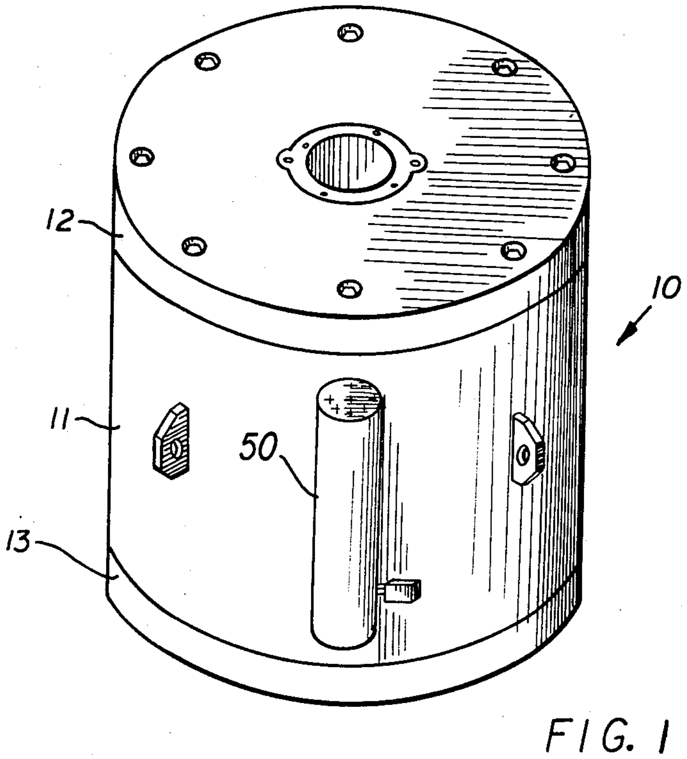
FIG. 1 is an isometric view of the high gradient superconductor magnetic separator according to the invention.
Figure 2:
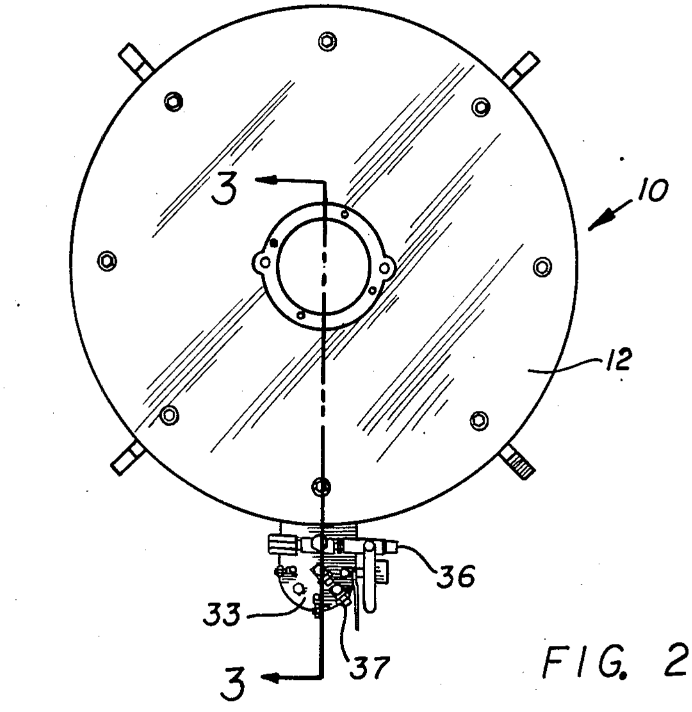
FIG. 2 is a top view of the high gradient superconductor magnetic separator shown in FIG. 1.
Figure 3:
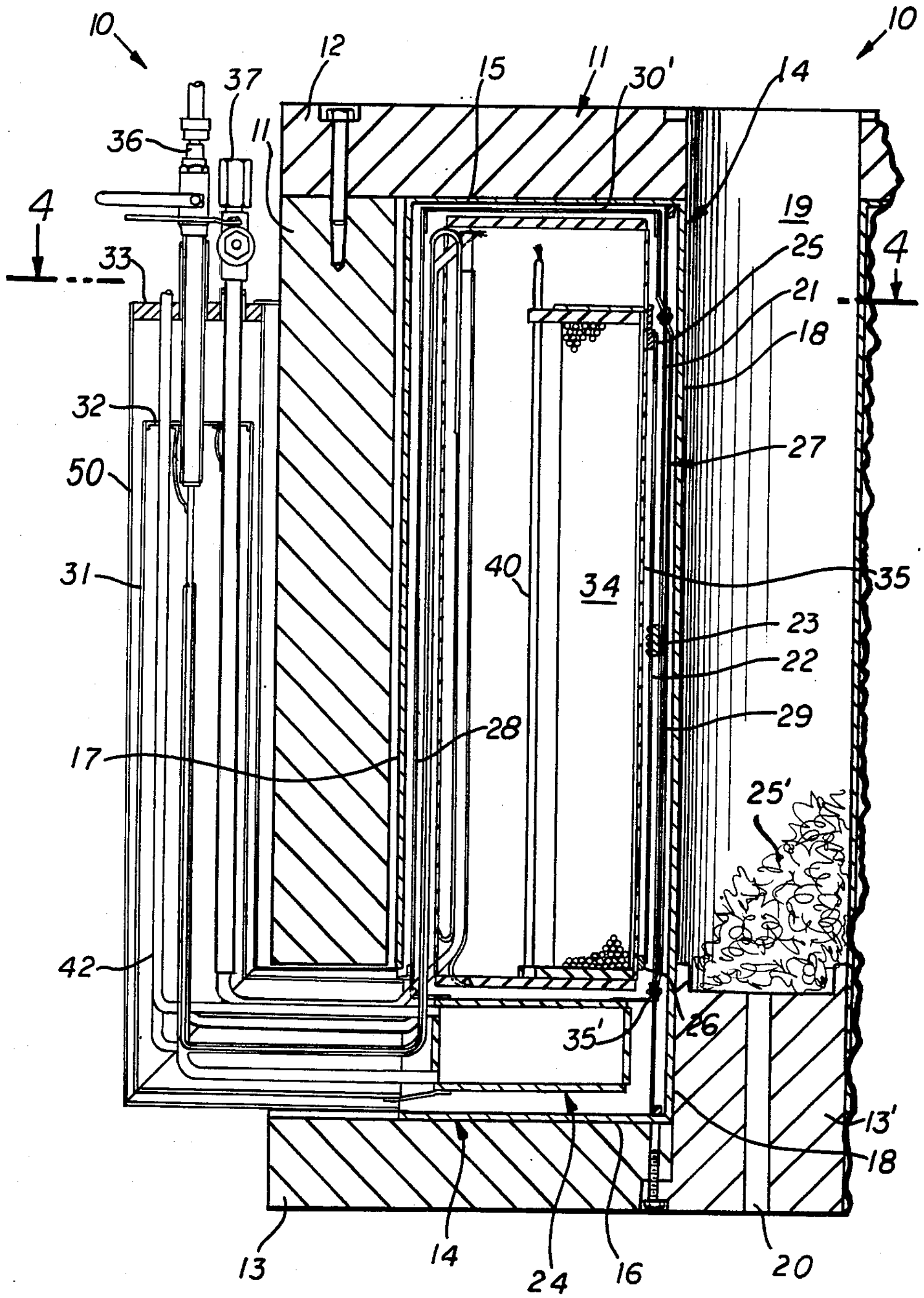
FIG. 3 is a longitudinal cross sectional view of the high gradient superconductor magnetic separator taken on line 3—3 of FIG. 2.
Figure 4:
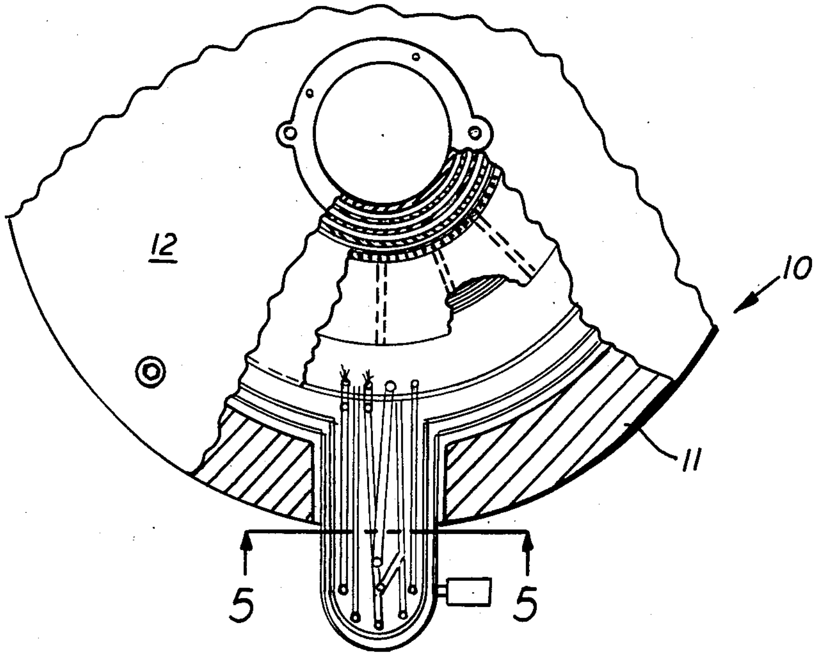
FIG. 4 is a partial cross sectional view taken on line 4—4 of FIG. 3.
Figure 5:
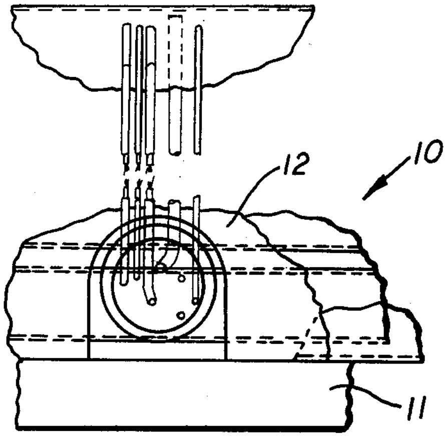
FIG. 5 is a partial top view of the high gradient superconductor magnetic separator shown in the drawings.

Now with more particular reference to the drawings Applicant shows a high gradient superconductor magnetic separator indicated generally at 10 having an outer cylindrical body 11, a circular disk like top 12 with a central opening and a bottom disk 13. The hollow cylindrical body 11, top 12 and bottom 13 are all made of relatively soft magnetizable iron. The bottom has a cylindrical iron pole member 13' that extends up into the hollow body and has the outlet feed pipe opening 20 extending through the bottom. The toroidal shaped vacuum vessel 14 is concentric to the warm chamber 19 at its center which extends through the central opening in the top plate 12. The toroidal vacuum chamber 14 has an annular disk like top 15, annular disk like bottom 16 and an outer cylindrical shell 17 and a central cylindrical shell 18. The central cylindrical shell forms the warm chamber and is of the same diameter as the opening in the top of the plate 12. The warm chamber 19 may contain magnetic stainless steel wool 25'. Feed pipe opening 20 can be connected to a fluid flow line.

The outer coil support ring 22 is in the form of a hollow cylinder concentric with the central wall 18 of the vacuum chamber and spaced outwardly therefrom. The inner coil support ring 21 rests on the bottom 16 of the vacuum vessel and is welded thereto by a suitable reinforcing ring. Inner coil support ring 21 is attached to outer coil support ring 22 at 23. Outer coil support 22 has its ends 25 and 26 attached to liquid helium chamber 35. The upper end of the inner coil support ring 22 is welded to the top plate 15 of the vacuum vessel by a suitable ring. A toroidal shaped nitrogen vessel 24 is supported on the inner coil support ring 21 by copper ring 35' and a generally toroidal shaped copper nitrogen shield 27 has an inner copper cylindrical wall 29 and an outer copper cylindrical wall 28 and an annular copper disk top 30'. The bottom of the toroidal shaped nitrogen shield 27 is formed by the liquid nitrogen vessel 24.

A tubular liquid nitrogen shield conduit 31 is connected to an opening in one side of the liquid nitrogen shield and it extends outwardly and upwardly to an end 32. The nitrogen shield conduit 31 is concentrically disposed in the vacuum chamber conduit 50 and concentric thereto. The upper end of the nitrogen shield conduit 31 is closed by an upper end member 32. Vacuum chamber 50 has its upper end closed by end 33. The superconductor electrical coil 34 is received in the toroidal liquid helium chamber 35 and is normally immersed in liquid helium. A liquid helium fill pipe 36 extends down through the liquid nitrogen conduit 31 and up through the space between the liquid helium vessel 35 and vacuum vessel 14. A liquid helium vent 37 likewise extends through the nitrogen conduit 31. Likewise liquid nitrogen conduit 42 passes through the liquid nitrogen shield conduit 31 to the liquid nitrogen vessel. Suitable sensing devices 40 extend through the liquid nitrogen conduit 42 and to the proper materials inside the closure.

ELECTRICAL CIRCUIT

Figure 6:
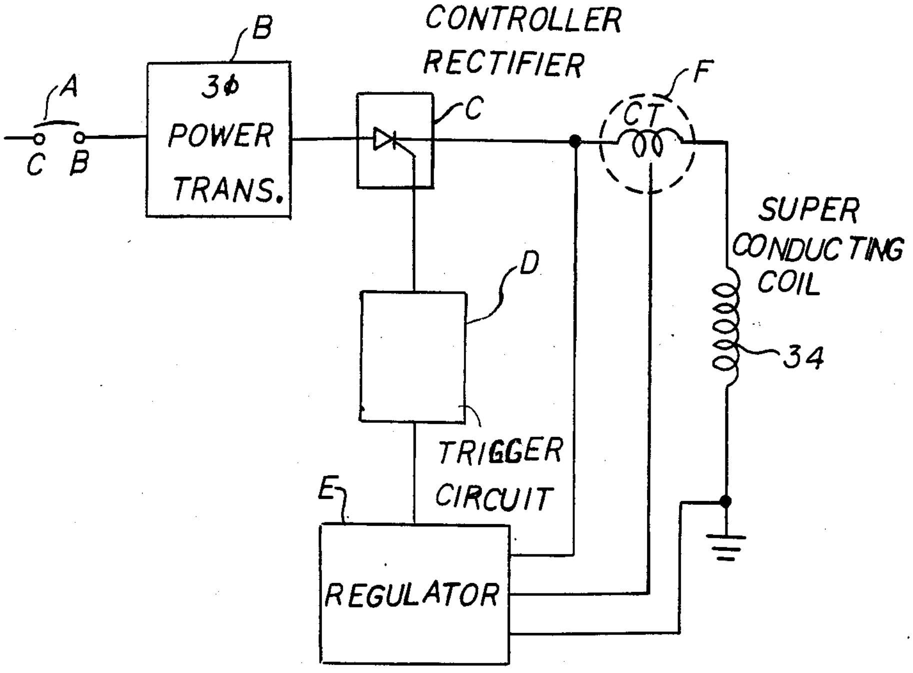
FIG. 6 is a block diagram of the electrical control circuit for the magnetic separator shown in FIGS. 1 through 5.
Figure 7:
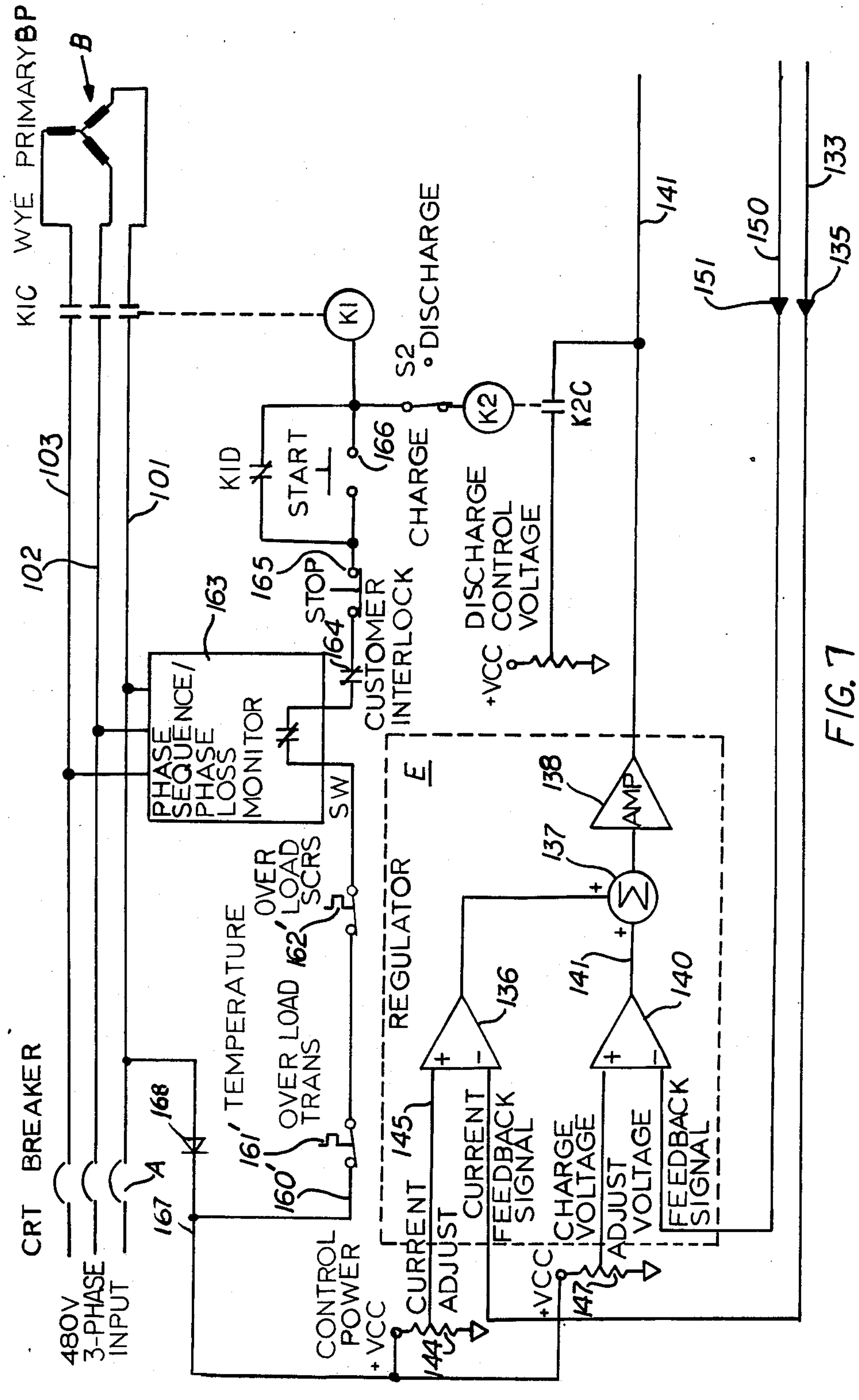
FIG. 7 is a partial block schematic diagram of a part of the regulator circuit for the magnetic separator shown in FIGS. 1 through 5.
Figure 8:
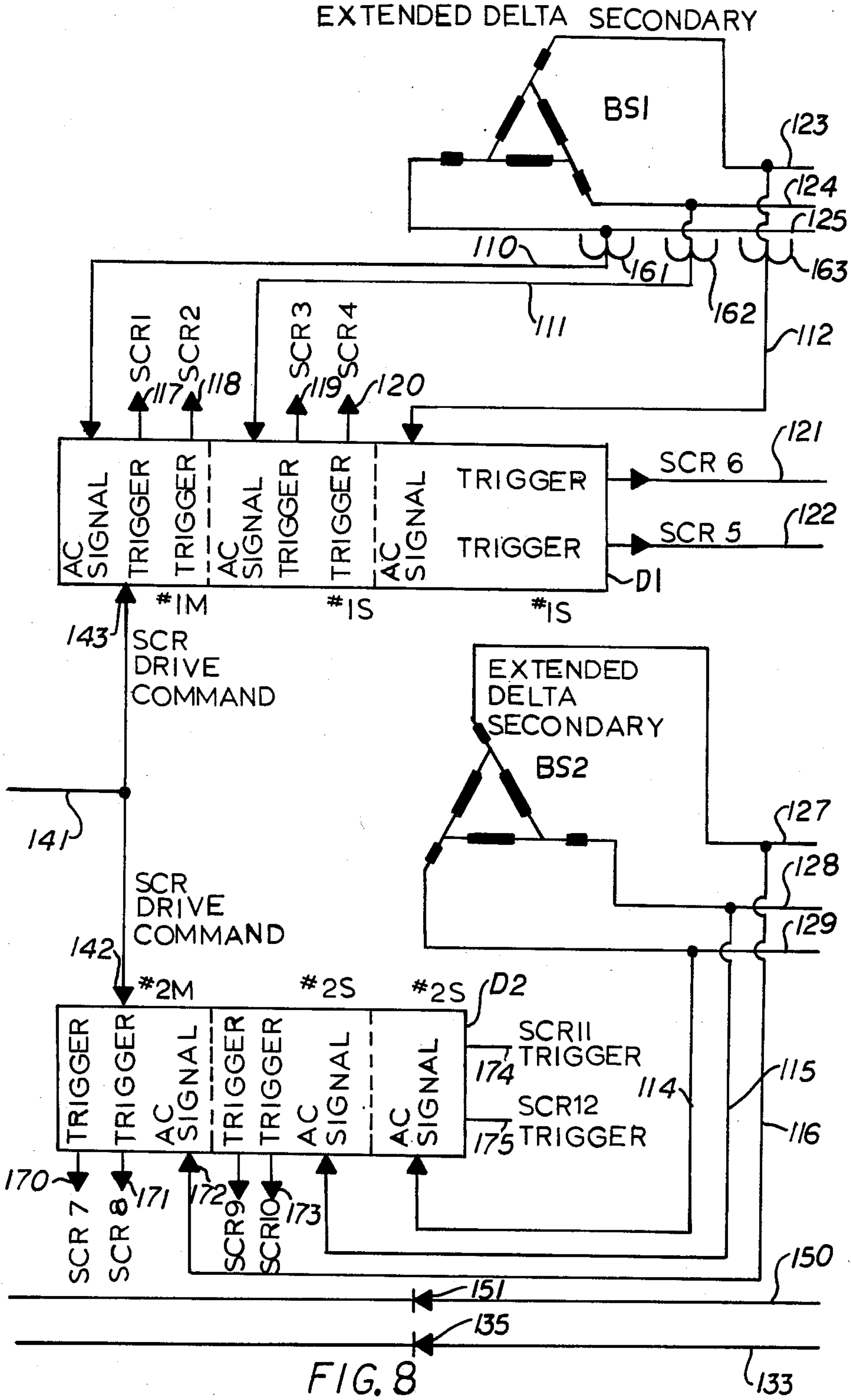
FIG. 8 is a partial block schematic diagram of a part of the regulator circuit for the magnetic separator shown in FIGS. 1 through 5.
Figure 9:
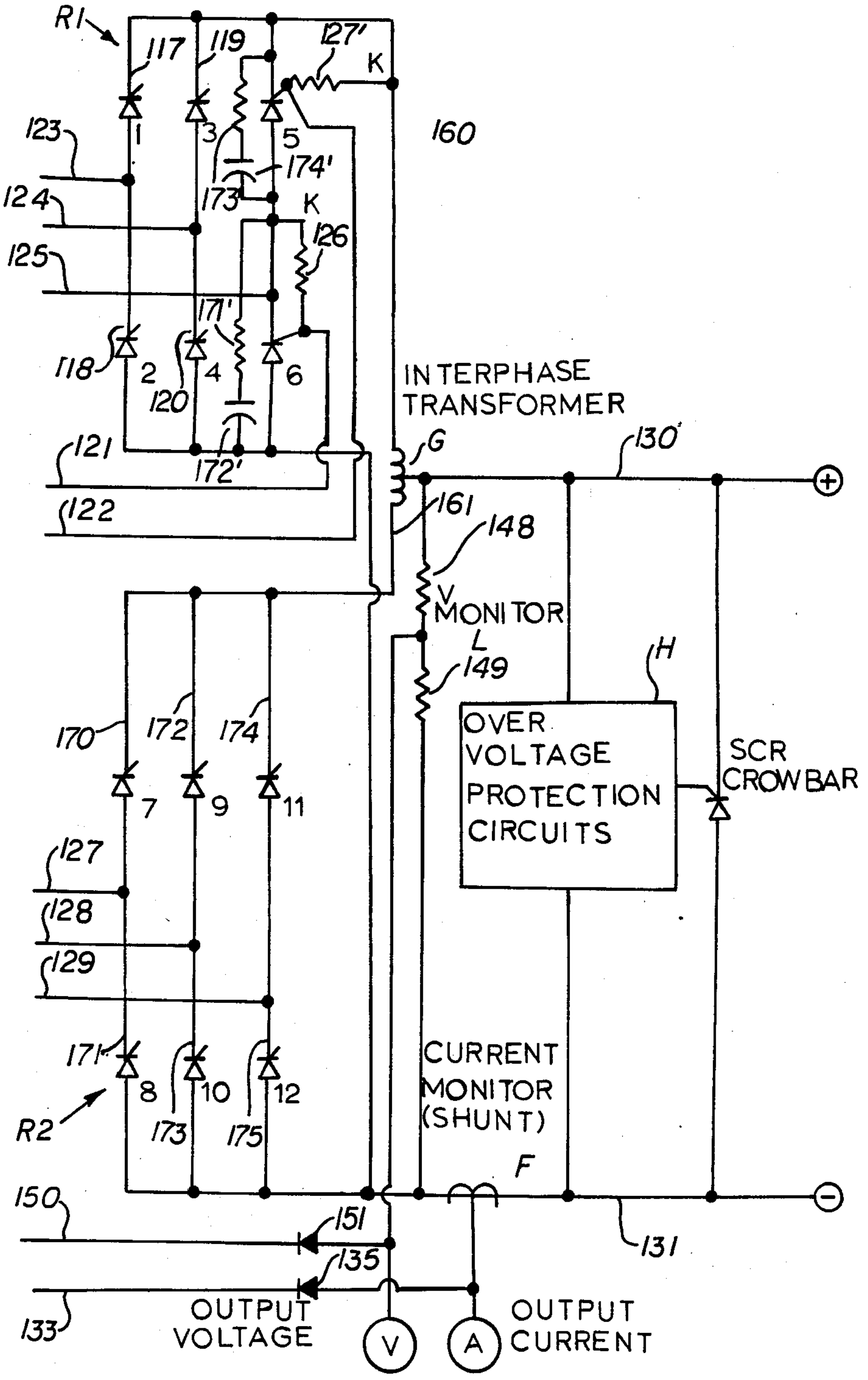
FIG. 9 is a partial block schematic diagram of another part of the regulator circuit of the magnetic separator shown in FIGS. 1 through 5.

The electrical circuit for controlling the current to the superconductor coil 34 is shown in the block diagram of FIG. 6 and in FIGS. 7, 8 and 9. The block diagram of FIG. 6 shows circuit breaker A which connects the three-phase power transformer B through the controller rectifier circuit C and the current transformer F to the superconductor coil 34. The regulator E is connected through the trigger circuit D to the rectifier circuit C. This circuit is more particularly shown in FIGS. 7, 8 and 9. In FIGS. 7, 8 and 9, 480 volt three-phase power is shown connected through circuit breaker A and normally open contacts K1C of relay K1 to the primary windings BP. The lines 101, 102 and 103 are also connected to phase sequence/phase loss monitor 163. Line 167 is connected to relays K1 and K2 through line 160', overload transformer 161', overload switch 162', phase sequence/phase loss monitor 163, normally closed contact customer interlock 164, normally closed stop switch 165 and normally open start switch 166. Interlock contact K1D is connected in parallel with start switch 166.

The primary windings BP of the transformer B are "Y" connected. The transformer B has two extended secondary windings BS1 and BS2, each of which are connected in delta form and connected through the trigger circuits D1 and D2 respectively, to the rectifier circuit C.

The second winding BS1 is connected through lines 110 and 111 and 112 to the AC trigger circuit D1. Ammeter connections 161'', 162'' and 163'' are inductive connections for ammeters for measuring the current in lines 110, 111 and 112. The secondary winding BS2 is connected through lines 114, 115 and 116 to the AC trigger circuit D2. The AC trigger circuit D1 is connected to the control elements of SCR1–SCR6 through lines 117–122. The secondary winding BS1 is connected through lines 123, 124 and 125 to the respective terminals of the silicon control rectifiers 1 through 6 of rectifier circuit R1. It will be noted that the control terminal of rectifier SCR5 is connected through resistor 127' to the line 160 and the control element of SCR6 is connected through resistor 126 to line 125. Resistor 171' and capacitor 172' are connected in parallel with SCR6 and resistor 173' and capacitor 174' are connected in parallel with SCR5. The silicon controlled rectifiers are connected as bridge rectifier circuits with the respective delta secondary winding connected at the junction of a respective anode and cathode of a pair of the SCRs.

The extended secondary winding BS2 of transformer B is connected through lines 127, 128 and 129 to the respective terminals of silicon control rectifiers 7-12. The line 160 connect rectifiers 1 through 6 to the interphase transformer G. The line 131 is connected to the negative terminal of the coil 34 and through the current transformer F to the rectifier circuits R1 and R2. The line 161 connects rectifier circuit R2 to an end terminal of interphase transformer G. The center tap of transformer G is connected through wire 130 to the positive terminal of coil 34.

The current transformer is connected through line 133 and diodes 135 to the current feedback signal terminal on circuit component 136 of the regulator E which, in turn, may be connected to mixer 137 and then through amplifier 138 and line 141 to the drive command terminals of trigger circuits D1 and D2. The voltage of the coil is monitored through the voltage divider made up of resistors 148 and 149 which through line 150 and diodes 151 transfer a voltage signal to the electrical circuit component 140 and then through line 141 to mixer 137 which is fed into amplifier 138. The amplified signal 138 is fed through line 141 to the SCR drive command terminals 142 and 143. Reference control voltage is provided by line 167 through rectifier 168 from line 101. The current adjust component 144 is connected through line 145 to the circuit component 136 and the voltage adjust control 147 is connected to the circuit component 140.

Figure 10:
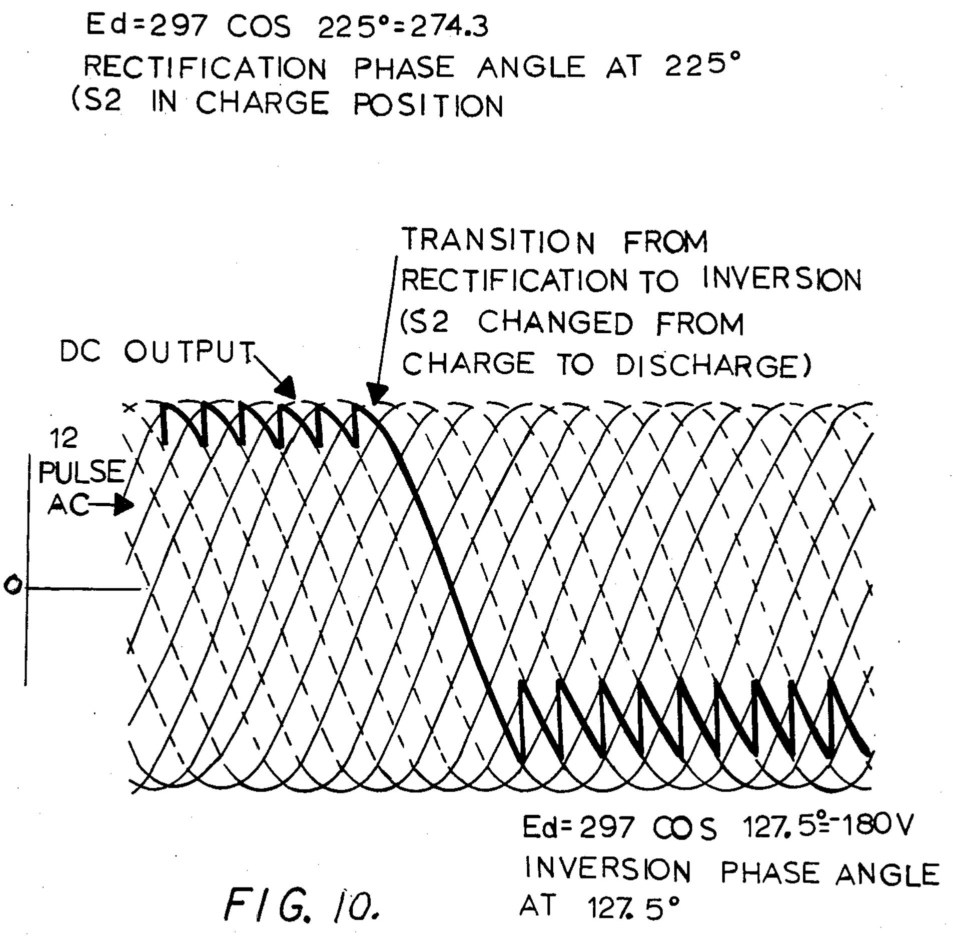
FIG. 10 is diagram of a wave shape showing DC output from the rectifier showing the 12 pulse wave, transition from rectification to inversion and the inversion phase.

The superconductor coil is powered by 12 pulse DC from rectifier circuits R1 and R2. The magnitude and direction of voltage on coil 34 is monitored and controlled by regulator E. Coil 34 is protected from overvoltage by circuits H and the SCR crowbar. Current for magnetizing coil 34 is controlled by current transformer F through regulator E. The coil 34 is discharged by placing switch S2 in the discharge position. This changes the firing time of rectifiers SCRs 1 through 12 which with the inductance of coil 34 provides an inverter action on the output voltage transition from rectification to inversion. FIG. 10 depicts a rectification phase angle of 225° resulting in a voltage Ed cos 225°=274.3 volts. After transition to negative voltage the phase angle in the example depicted as Ed=297 cos 127.5=180 V inversion phase angle at 127.5°. FIG. 10 shows the 12 pulse voltage to coil 34 and shows the transition from rectification to inversion when switch S2 is opened. FIG. 10 shows a typical coil current wave shape. The 12 pulses are shown in light lines and the composite DC voltage is shown in the heavy lines. The transition from rectification to inversion when switch S2 is moved from the charge to the discharge position is shown, together with the heavy line showing the pulsed DC during discharge with inverted DC.

Figure 11:
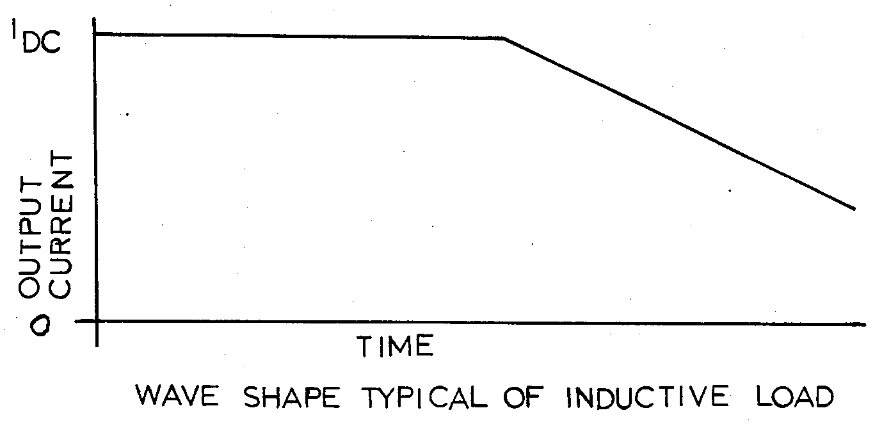
FIG. 11 is a typical wave shape of an inductive load such as in the application disclosed herein.

The current curve FIG. 11 is typical of the inductive load of the superconductor coil. The inductance of the coil opposes a change of current in the coil and reduces gradually when the coil voltage is reversed.

The embodiments of the invention in which an exclusive property or privilege is claimed are defined as follows:

1. In a high gradient superconductor magnet separator comprising,
- a hollow cylindrical enclosure made of ferrous material and having an axially disposed flow passage therethrough,
- a toroidal shaped vacuum vessel in said cylindrical enclosure,
- a toroidal shaped liquid nitrogen vessel in said vacuum vessel,
- a toroidal shaped liquid helium vessel in said vacuum vessel,
- said toroidal shaped liquid helium vessel being disposed concentrically to and above said liquid nitrogen vessel and spaced therefrom,
- a coil made of superconducting material in said liquid helium vessel,
- an inner coil support ring in said vacuum vessel and concentric to said flow passage,
- said inner coil support ring having a lower end supported on said vacuum vessel and an upper end engaging said vacuum vessel,
- an outer coil support ring,
- said outer coil support ring having an upper end attached to said liquid helium vessel and a lower end attached to the liquid helium vessel and an intermediate part attached to an intermediate part of said inner coil support ring at a position spaced from said upper and lower ends of said inner coil support ring.

2. The high gradient superconductor magnetic separator recited in claim 1 wherein said vacuum vessel has walls,
- a liquid nitrogen shield is disposed between on of said vacuum vessel walls and said inner coil support ring, and
- said liquid nitrogen shield being disposed between said vacuum vessel and said liquid helium vessel.

3. The high gradient superconductor magnetic separator recited in claim 2 wherein said outer coil support ring is disposed between said liquid nitrogen shield and said liquid helium vessel,
- an electrical circuit for magnetizing said magnet separator is connected to said coil and,
- said outer coil support ring having an intermediate part fixed to said inner coil support ring and its ends fixed to spaced positions on said liquid helium vessel.

4. The high gradient superconductor magnetic separator recited in claim 3 wherein said liquid nitrogen shield is made of a high thermal conductive material.

5. The high gradient superconductor magnetic separator recited in claim 3 wherein said vacuum vessel has an opening in one side thereof,
- a tubular vacuum conduit is attached to said vacuum vessel and extends from said opening, and
- a tubular heat shield conduit is disposed inside said vacuum conduit and connected to said liquid nitrogen shield.

6. The high gradient superconductor magnetic separator recited in claim 5 wherein said electrical circuit comprises a full wave rectifier connected to said coil,
- said circuit including means whereby said coil is rapidly ramped up and down.

7. The high gradient superconductor magnetic separator recited in claim 6 wherein said nitrogen shield is made of copper.

8. The high gradient superconductor magnetic separator recited in claim 7 wherein a liquid helium fill pipe is disposed in said vacuum conduit and a liquid nitrogen fill pipe extends through said tubular conduit and is connected to said liquid nitrogen vessel.

9. The high gradient superconductor magnetic separator recited in claim 8 wherein a nitrogen exhaust pipe extends through said conduit and a helium exhaust pipe extends through said conduit.

10. The high gradient superconductor magnetic separator recited in claim 9 wherein said liquid nitrogen shield comprises a toroidal shaped member.

11. The high gradient superconductor magnetic separator recited in claim 10 wherein said liquid nitrogen shield and said liquid nitrogen vessel define an enclosure for said liquid helium vessel.

12. The high gradient superconductor magnetic separator recited in claim 10 wherein said coil is made of a niobium-titium alloy.

13. The high gradient superconductor magnetic separator recited in claim 10 wherein said liquid nitrogen shield (31) comprises an inner cylinder member (27) having an upper end and a lower end, an outer cylindrical member (28) having an upper end and a lower end, a top annular disk (30') connected to the upper ends of said inner cylindrical member and said outer cylindrical member, lower ends of said inner cylindrical member and said outer cylindrical member being fixed to said nitrogen vessel forming a toroidal shaped chamber containing said helium vessel.

14. The high gradient superconductor magnetic separator recited in claim 1 wherein an electrical circuit is provided, said electrical circuit having a power transformer, a rectifier having control means, a current transformer connected to said coil, a regulator connected to said rectifier control means, trigger means including a first trigger circuit and a second trigger circuit, said trigger circuits being adapted to control said rectifier control means whereby said coil is fast ramped substantially to magnetization and fast ramped substantially to demagnetization at predetermined times.

15. The high gradient superconductor magnetic separator recited in claim 14 wherein said rectifier is a silicon control rectifier.

16. In combination a magnetic separator including a superconductor coil (34) and a bi-polar control circuit comprising, a circuit breaker (A), a three-phase transformer (B), a rectifier (C), a trigger circuit (D), a regulator (E), and a current transformer (F), said three phase transformer (B) having three phase primary windings connected together in Y-relation, first three-phase secondary windings (BS1) connected together in delta relation, second three-phase secondary windings (BS2) connected together in delta relation, said rectifier (C) comprising six first silicon control rectifiers and six second silicon control rectifiers, said first six silicon control rectifiers being connected to form a first full wave rectifier circuit (C1), said second silicon control rectifiers being connected together to form a second full wave rectifier circuit (C2), an interphase transformer (G), said interphase transformer (G) having a winding having a first end, a second end and an intermediate part, said first full wave rectifier circuit (C1) and said second full wave rectifier circuit (C2) being connected respectively to the end terminals of said interphase transformer (G), said intermediate part of said interphase transformer (G) being connected to said coil (34), said first full wave rectifier circuit (C1) connecting said first secondary windings (BS1) through said interphase transformer to said coil (34), said second full wave rectifier (C2) connecting said second secondary windings (BS2) through said interphase transformer to said coil (34), over voltage protection means (H) connected in parallel with said coil (34), said current transformer (F) being connected in series with said coil (34), said trigger circuit comprising first trigger means and second trigger means, said first trigger means being connected to said SCR's of said first full wave rectifier circuit (C1), said second trigger means being connected to said second full wave rectifier circuit (C2), switching means (S2) for connecting said regulator (E) to said first trigger means and to said second trigger means during a charge cycle of said coil, second switching means to connect said switching means to said first trigger means and said second trigger means during a discharge cycle of said coil (34), current feedback means including said current transformer (F) connected to said regulator (E) for controlling said rectifier (C) and thereby regulating the current in said coil (34) and, voltage monitor means (V) connected in parallel with said coil (34) and connected to said regulator (E) for controlling the voltage to said coil (34).

17. The combination recited in claim 16 wherein said switching means to connect said regulator to said trigger circuits and to disconnect said regulator comprises a switch.

18. The combination recited in claim 17 wherein a phase sequence loss monitor is connected to said primary of said three-phase transformer and controls a switch connected in series with said switching means connecting said regulator to said coil.

19. The combination recited in claim 18 wherein said full wave rectifier circuits are made up of silicon control rectifiers having control elements, said first trigger means and said second trigger means are connected to said control elements, current adjust and voltage adjust means are provided cooperating with said superconductor coil to phase shift voltage to the coil whereby the rate of flow of current in said coil is reduced.

20. The combination recited in claim 19 wherein said circuit comprises inversion means whereby a 12 pulse rectifier AC current is applied to said coil for demagnetizing it.

* * * * *